US011091915B2

United States Patent
Igo

(10) Patent No.: US 11,091,915 B2
(45) Date of Patent: Aug. 17, 2021

(54) EMBED PAN

(71) Applicant: John Igo, Edmond, OK (US)

(72) Inventor: John Igo, Edmond, OK (US)

(73) Assignee: FORMULATED MATERIALS LLC, Oklahoma City, OK (US)

(*) Notice: Subject to any disclaimer, the term of this patent is extended or adjusted under 35 U.S.C. 154(b) by 127 days.

(21) Appl. No.: 16/175,385

(22) Filed: Oct. 30, 2018

(65) Prior Publication Data

US 2019/0145517 A1    May 16, 2019

Related U.S. Application Data

(60) Provisional application No. 62/586,001, filed on Nov. 14, 2017.

(51) Int. Cl.
*E04F 11/18*     (2006.01)
*E04H 12/22*     (2006.01)

(52) U.S. Cl.
CPC ...... *E04F 11/1812* (2013.01); *E04F 11/1817* (2013.01); *E04H 12/2261* (2013.01)

(58) Field of Classification Search
CPC ............... E04F 11/1812; E04F 11/1817; E04F 11/1814; E04B 1/003; E04B 1/66; E04H 12/2261; E04H 12/2269; E02D 27/42; E04D 13/14
See application file for complete search history.

(56) References Cited

U.S. PATENT DOCUMENTS

| | | | | |
|---|---|---|---|---|
| 4,747,241 | A * | 5/1988 | Whitman | E04D 5/143 411/258 |
| 6,640,511 | B1 * | 11/2003 | Link | E04D 3/3603 52/410 |
| 9,121,180 | B2 * | 9/2015 | Stanley | E04D 13/1407 |
| 9,212,833 | B2 * | 12/2015 | Stearns | F16B 43/001 |
| 10,161,135 | B2 * | 12/2018 | DeGraan | E04D 13/14 |
| 10,344,788 | B2 * | 7/2019 | Blum | F16B 37/04 |
| 2004/0173255 | A1 * | 9/2004 | Heckeroth | H01L 31/048 136/245 |
| 2019/0145517 | A1 * | 5/2019 | Igo | E04F 11/1812 277/648 |

OTHER PUBLICATIONS

Chris Swanson, *Railing Feet vs. Deck Coating*, WICR Waterproofing Blog, Feb. 12, 2016, pp. 1-3.
Rocco Romero, RA, Hidden Holes in Wood-Framed Balcony Waterproofing, Building Envelope Technology Symposium, RCI, Inc., Nov. 2010, pp. 1-10.

* cited by examiner

*Primary Examiner* — Andrew J Triggs
(74) *Attorney, Agent, or Firm* — McAfee & Taft

(57) ABSTRACT

Disclosed is an embed pan suitable for use with railing embed plates. Railing embed plates are commonly attached by bolts to balcony decks as supports for balcony railings. The disclosed embed pan provides a watertight seal around railing embed plate.

8 Claims, 5 Drawing Sheets

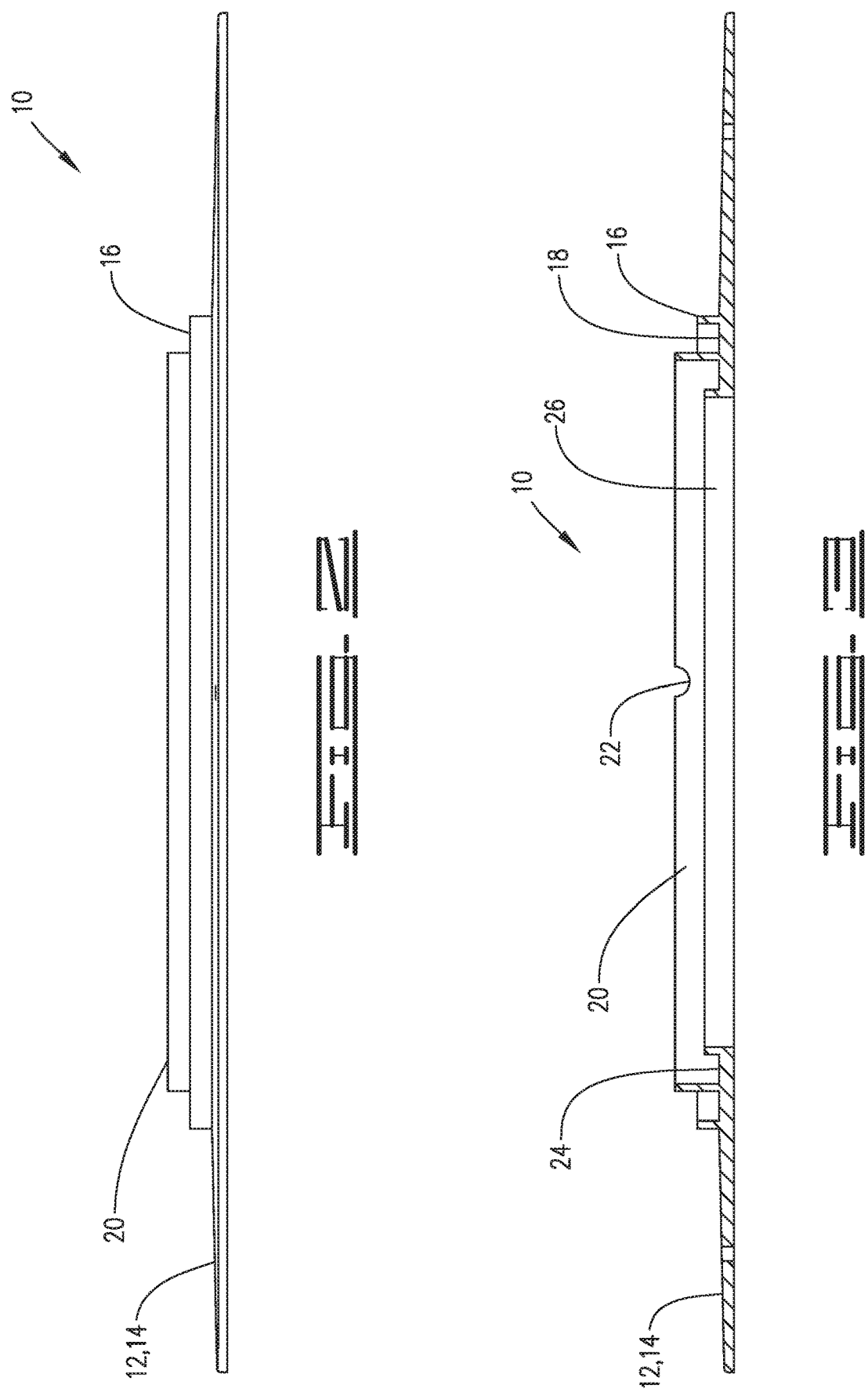

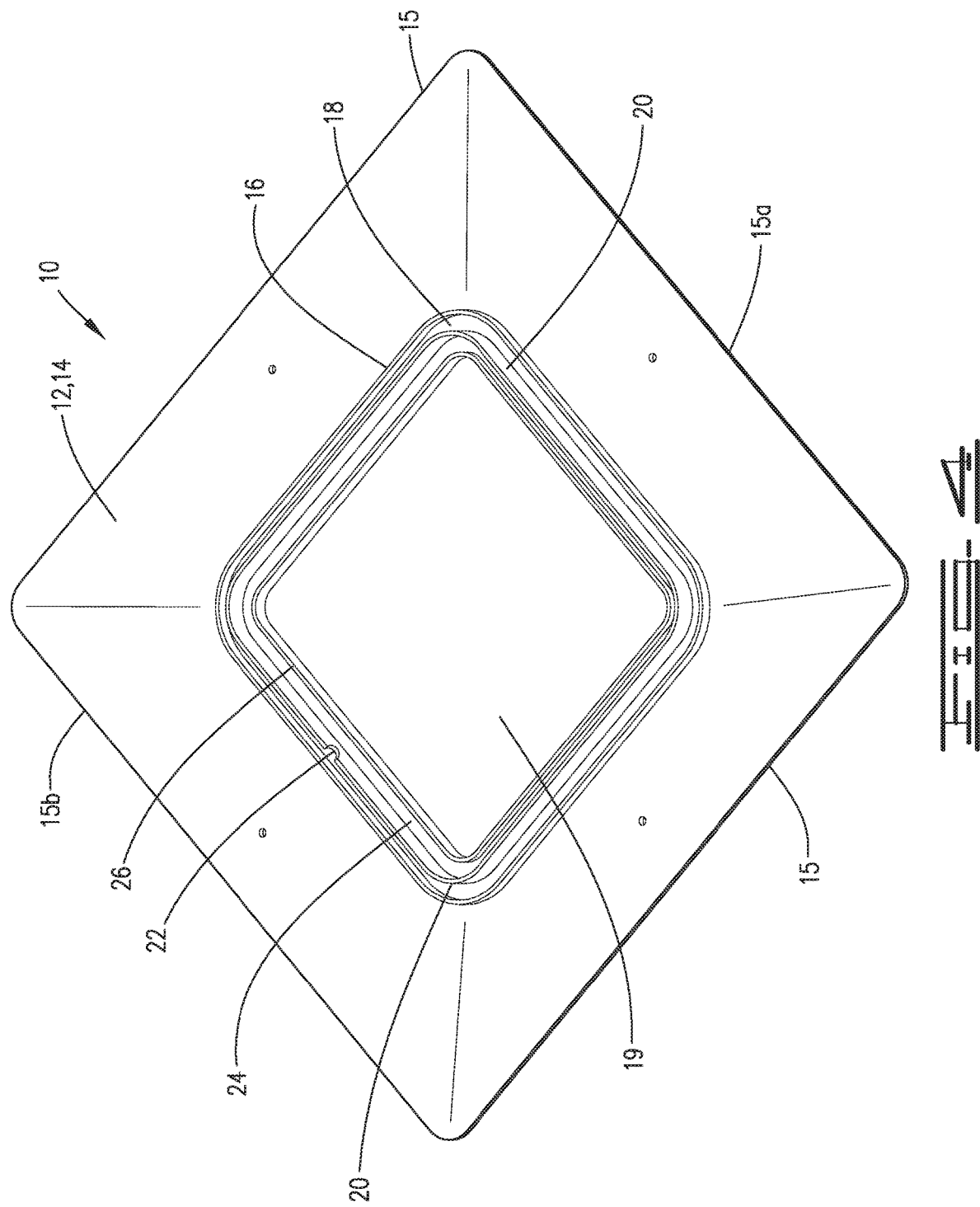

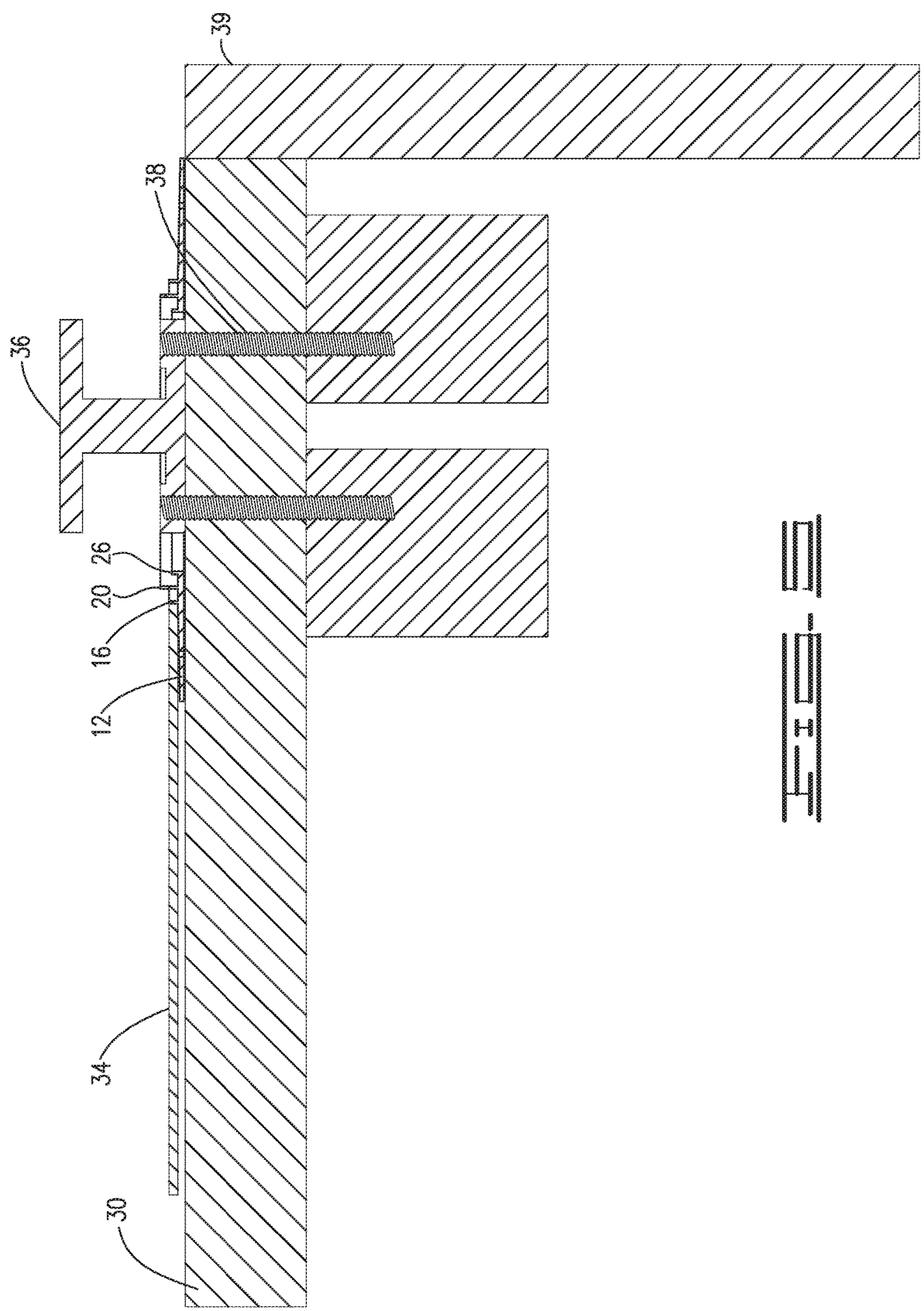

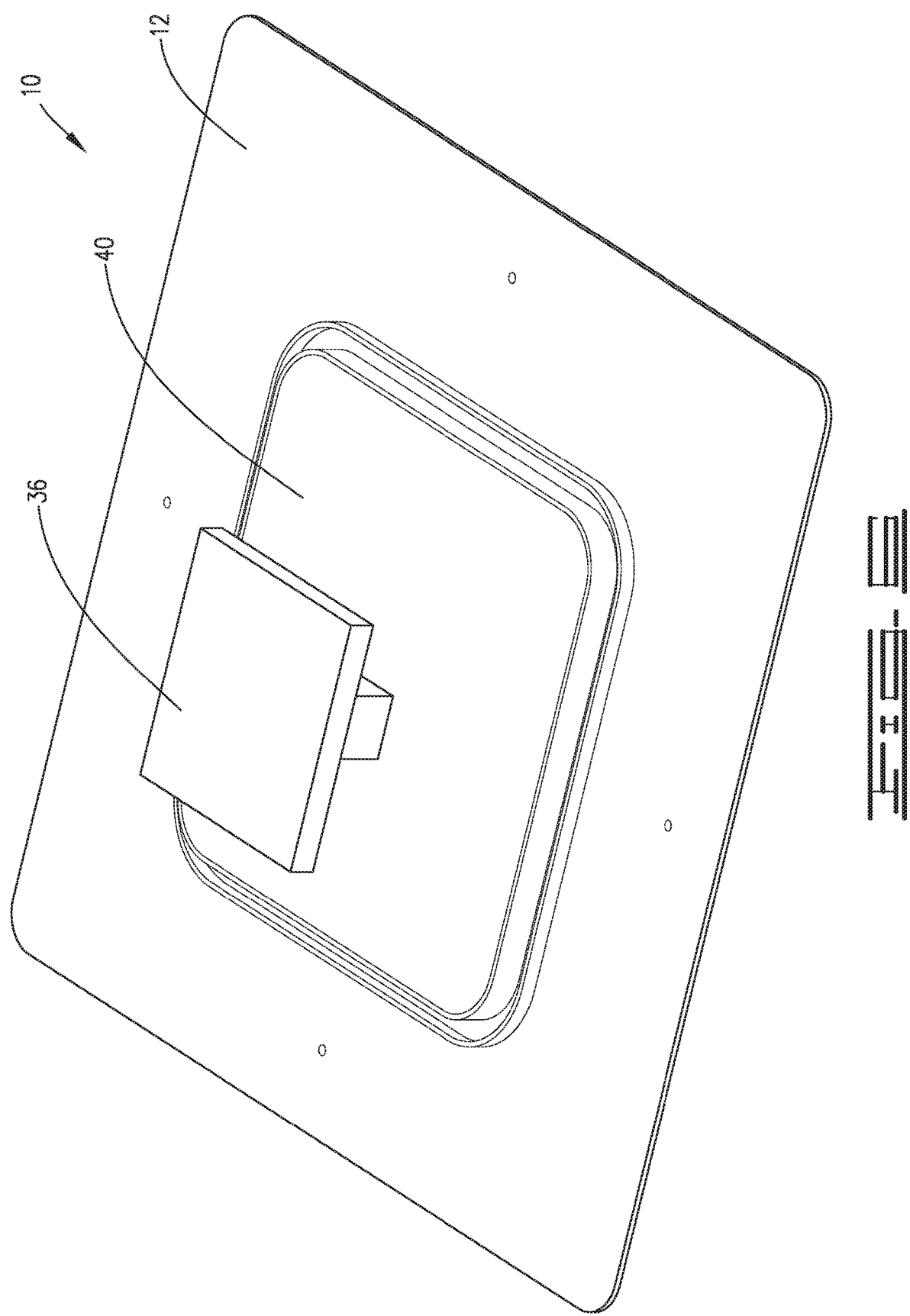

EMBED PAN

CROSS REFERENCE TO RELATED APPLICATION

This Application claims the benefit of Provisional Patent Application No. 62/586,001 filed on Nov. 14, 2017, which is hereby incorporated by reference.

BACKGROUND

Balcony railing systems installed in association with apartment buildings and hotels are subject to failure due to the corrosion of the railing embed plates supporting the railing system and/or degradation of the balcony deck due to intrusion of water around the railing embed plates.

SUMMARY

Disclosed is an embed pan comprising a first upwardly projecting flange having an upper edge and a second upwardly projecting flange having an upper edge. Each upwardly projecting flange surrounds a central opening. The central opening passes through the embed pan. The embed pan also has a planar portion extending outwardly from the first upwardly projecting flange. The planar portion has a taper which reduces the thickness of the planar portion wherein the planar portion is thinnest at the outer edge thereof.

Also disclosed is an embed pan comprising a first upwardly projecting flange having an upper edge, a second upwardly projecting flange having an upper edge and a third upwardly projecting flange having an upper edge. Each upwardly projecting flange surrounds an opening passing through the pan. The third upwardly projecting flange is located adjacent to the opening and the second upwardly projecting flange is located between the first and third upwardly projecting flanges. The upper edge of the second upwardly projecting flange extends beyond the upper edges of the first and third upwardly extending flanges. A notch is located in the upper edge of the second upwardly projecting flange. The embed pan includes a planar portion extending outwardly from the first upwardly projecting flange. The planar portion has a taper which reduces the thickness of the planar portion wherein the planar portion is thinnest at the outer edge thereof.

Also disclosed is an embed pan comprising a first upwardly projecting flange having an upper edge, a second upwardly projecting flange having an upper edge and a third upwardly projecting flange having an upper edge. Each upwardly projecting flange surrounds an opening passing through said pan. The third upwardly projecting flange is located adjacent to said opening and said second upwardly projecting flange is located between said first and third upwardly projecting flanges. The upper edge of said second upwardly projecting flange extends beyond the upper edges of said first and third upwardly extending flanges. A first trough separates the first and second upwardly projecting flanges and a second trough separates the second and third upwardly projecting flanges. A notch is located in the upper edge of the second upwardly projecting flange. The embed pan has a planar portion with an upper surface and an underside surface. The planar portion extends outwardly from the first upwardly projecting flange and the planar portion has a taper. The taper reduces the thickness of the planar portion wherein the planar portion is thinnest at the outer edge thereof.

BRIEF DESCRIPTION OF THE DRAWINGS

FIG. 2 is a side view of the disclosed embed pan.
FIG. 3 is a side cut-away view taken along line 3-3 of FIG. 1.
FIG. 4 is a perspective view of the disclosed embed pan.
FIG. 5 is a cut-away view of the disclosed embed pan as installed on a balcony with a railing base positioned within the central opening of the embed pan.
FIG. 6 is a perspective view of the disclosed embed pan with a railing base positioned within the central opening of the embed pan.

DETAILED DESCRIPTION

Figure 1:
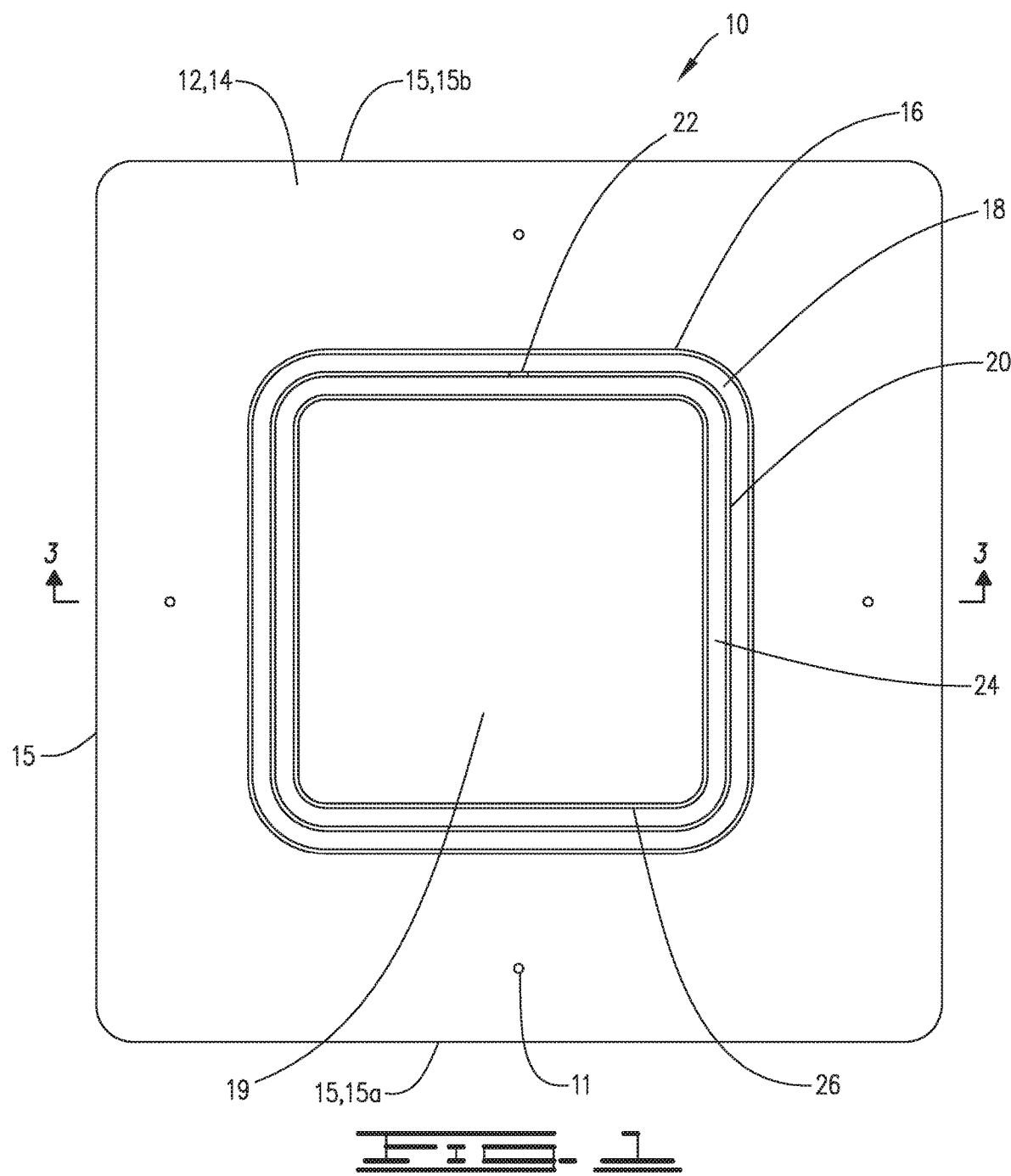
FIG. 1 is a top view of the disclosed embed pan.

With reference to FIGS. 1-4 and 6, disclosed is an embed pan 10 suitable for use with railing embed plates 36. As known to those skilled in the art, railing embed plates 36 are commonly attached by bolts 38 to balcony decks 30 as supports for balcony railings.

Embed pan 10 provides a watertight seal around railing embed plate 36 thereby reducing the likelihood of corrosion of the primary support for balcony railings. Additionally, embed pan 10 cooperates with any optional waterproof membrane 34 applied over the balcony deck 30 to substantially preclude seepage of water to the surface of the balcony deck 30. Further, embed pan 10, after installation with each embed plate, will be subsequently covered with a layer of cement. The layer of cement forms the primary surface of the balcony. Thus, embed pan 10 must be of relatively low profile to preclude extending above the cement layer or producing a cement layer that is too thin. As known to those skilled in the art, thin layers of cement are susceptible to degradation.

As depicted in FIGS. 1-4, embed pan 10 includes a generally planar portion 12, having an upper surface 14 and an underside surface, not shown. Planar portion 12 will have at least one hole 11 passing through planar portion 12. In most instances, planar portion 12 will have at least two to four holes 11. A series of at least two flanges 20 and 26 surround a central opening 19. In most embodiments, three flanges 16, 20 and 26 surround central opening 19. Although depicted as a generally square opening, central opening 19 may take any shape. Although not required, the shape of opening 19 will correspond generally to the shape of embed plate 36. Central opening 19 will be larger than the base portion of railing embed plate 36. Typically, central opening 19 will have a side-to-side distance of about 3.5 inches to 8.5 inches. When central opening 19 is circular in design, the diameter of opening 19 will generally be about 3.5 inches to 8.5 inches.

In most embodiments, planar portion 12 will have a taper beginning from first flange 16 in the direction of the outer edge 15 of planar portion 12. The taper reduces the thickness of planar portion 12 by about 0.15 inch per foot to about 0.35 inch per foot. In most embodiments, the taper will reduce the thickness of the planar portion by about 0.25 inch per foot.

Optional first flange 16 extends upward from top side 14 of planar portion 12 by about 0.125 inch to about 0.24 inch. Typically, first flange 16 extends upward from top side 14 about 0.1875 inch above the planar portion. When measured from the underside surface of planar portion 12, second flange 20 extends upward about 0.375 inch to about 0.625 inch. In most embodiments, second flange 20 will extend upward about 0.5 inch above the planar portion. An optional trough 18 separates first flange 16 from second flange 20.

Trough 18 defines a gap between flanges 16 and 20 of about 0.1 inch to about 0.4 inch. In most embodiments, trough 18 defines a gap of about 0.2 inch to about 0.3 inch. Generally, trough 18 defines a gap of about 0.25 inch. When measured from the underside surface of planar portion 12, third flange 26 extends upward by about 0.15 inch to about 0.35 inch. Typically, third flange 26 extends upward about 0.25 inch. Thus, flange 20 extends the greatest distance upward. Flange 16, extending from the thicker portion of planar portion 12, extends slightly higher than flange 26. Finally, an optional trough 24 separates second flange 20 from third flange 26. Trough 24 defines a gap between flanges 16 and 20 of about 0.1 inch to about 0.4 inch. In most embodiments, trough 24 defines a gap of about 0.2 inch to about 0.3 inch. Generally, trough 24 defines a gap of about 0.25 inch.

In one embodiment, flange 26, trough 24 and flange 20 provide an increase in surface area available for contact by sealant 40. The increased surface area enhances adhesion of sealant 40 to embed pan 10. Additionally, the increased surface area in cooperation with sealant 40 results in the formation of a poured-in-place gasket formed upon curing of sealant 40. Thus, the combination of flange 26, trough 24 and flange 20 with cured sealant 40 substantially precludes penetration of water to the mounting points of embed plate 36. Further, the low profile of flanges 20 and 26 allows for adequate coverage of embed pan 10 with the overlay surface of cement.

Although depicted in the FIGS. as centralized, central opening 19 may be closer to any given edge of planar portion 12. In one embodiment, central opening 19 will be located closer to the edge 15a of planar portion 12. When installed, edge 15a will be closest to the outer edge of balcony deck 30 and edge 15b will be furthest from the edge of balcony deck 30. Thus, in one embodiment, the distance from flange 16 to edge 15a of planar portion 12 may be from about 2 inches to about 3 inches and the distance from flange 16 to the edge 15b of planar portion 12 may be from about 2 inches to 4 inches. In most embodiments, the distance from flange 16 to edge 15a will be from about 2.5 inches to about 3 inches and the distance from flange 16 to edge 15b will be from about 2 inches to 3.5 inches.

As depicted in FIGS. 3 and 4, central flange 20 includes a notch 22. Notch 22 provides a fluid passageway from trough 24 to the exterior of flange 20. As such, the lower edge of notch 22 is about 0.1 inch to about 0.25 inch below the upper edge of flange 20. Notch 22 has a width of about 0.15 inch to about 0.35 inch wide. Typically, the lower edge of notch 22 is about 0.1875 inch below the upper edge of flange 20 and has a width of about 0.25 inch. In one embodiment, the lower edge of notch 22 is located at the same elevation as the upper edge of flange 16. Notch 22 also provides a guide during installation of embed pan 10 to a balcony deck 30. In most embodiments, when central opening is positioned closer to one edge of planar portion 12, notch 22 will be located on the side of central opening 19 that corresponds to edge 15b.

Installation and use of embed pan 10 entails positioning of embed pan 10 on balcony deck 30 with railing embed plate 36 located within central opening 19. As discussed above, edge 15a will be located nearest the outer edge 39 of balcony deck 30 and edge 15b will be located furthest from the outer edge of balcony deck 30. Thus, edge 15a and notch 22 faces outer edge 39 of balcony deck 30 while edge 15b faces away from outer edge 39. Embed plate 10 is secured to balcony deck 30 with screws, bolts or other suitable devices passing through at least one hole 11. After securing embed plat 10 to deck 30, a sealant 40 is applied to the area within central opening 19. The sealant may be any conventional polymeric material approved for the intended application of embed pan 10. In general, polyurethane and other similar sealants will be used.

The volume of sealant will fill at least the area within central opening 19 up to the top of flange 26 corresponding to side 15b. Typically, the volume of sealant will fill the area defined by central opening 19 up to the top of flange 20 on side 15a. At a minimum, the volume of sealant should fill at least a portion of trough 24. In most embodiments, the volume of sealant will generally reach at least reach the lower level of notch 22. Thus, the volume of sealant will generally fill trough 24 all the way around central opening 19. After curing of sealant 40, when sealant fills the area of central opening 19 to the lower edge of notch 22, notch 22 acts as a fluid passageway for any water collected on the surface of cured sealant 40 allowing the water to migrate to trough 18. Thus, the configuration of embed pan 10 directs water away from railing embed plate 36. Additionally, cured sealant 40 acts as a poured-in-place gasket.

Optionally, after application of sealant 40, waterproof membrane 34 may be applied over balcony deck 30 and over planar portion 12 of embed plate 10.

Other embodiments of the present invention will be apparent to one skilled in the art. As such, the foregoing description merely enables and describes the general uses and methods of the present invention. Accordingly, the following claims define the true scope of the present invention.

What is claimed is:

1. An embed pan comprising:
   a first upwardly projecting flange having an upper edge, a second upwardly projecting flange having an upper edge and a third upwardly projecting flange having an upper edge, each upwardly projecting flange surrounding an opening passing through said pan, said third upwardly projecting flange is located adjacent to said opening and said second upwardly projecting flange is located between said first and third upwardly projecting flanges, said upper edge of said second upwardly projecting flange extends beyond the upper edges of said first and third upwardly extending flanges;
   said second upwardly projecting flange defining a first wall and said third upwardly projecting flange defining a second wall, said first and second walls facing each other;
   said first upwardly projecting flange defining a third wall, said second upwardly flange defining a fourth wall, said third wall and said fourth wall facing each other;
   a gap separates said third wall and said fourth wall, said gap, third wall and fourth wall define a first trough;
   a gap separates said first wall and said second wall, said gap, first wall and second wall define a second trough;
   a planar portion having an upper surface and an underside surface, said planar portion extending outwardly from said first upwardly projecting flange, said planar portion has a thickness and an outer edge; and,
   wherein said first upwardly projecting flange extends upward about 0.125 inch to about 0.25 inch from the upper surface of said planar portion, said second upwardly projecting flange extends upward about 0.375 inch to about 0.625 inch when measured from the underside surface of said planar portion, said third upwardly projecting flange extends upward about 0.15 inch to about 0.35 inch when measured from the underside surface of said planar portion, wherein said first trough defines a gap of about 0.1 inch to about 0.4 inch between said first and second upwardly projecting flanges and said second trough defines a gap of about 0.1 inch to about 0.4 inch between said second and third upwardly projecting flanges.

2. The embed pan of claim 1, further comprising a notch located in the upper edge of said second upwardly projecting flange.

3. The embed pan of claim 2, wherein said notch has a lower edge which is about 0.1 inch to about 0.35 inch below the upper edge of said second upwardly extending flange and said notch has a width of about 0.15 inch to about 0.35 inch.

4. The embed pan of claim 2, wherein said upper edge of said first upwardly projecting flange defines an elevation and wherein said notch has a lower edge located at the same elevation as the upper edge of said first upwardly projecting flange.

5. The embed pan of claim 1, wherein said planar portion has a taper which reduces the thickness of said planar portion wherein said planar portion is thinnest at the outer edge thereof.

6. The embed pan of claim 1, further comprising:
    an embed plate located within said opening; and,
    a poured in place gasket, said gasket substantially fills said opening and extends into said second trough.

7. The embed pan of claim 6, wherein said poured in place gasket substantially fills said second trough.

8. The embed pan of claim 7, further comprising a notch located in the upper edge of said second upwardly projecting flange; and,
    said poured in place gasket fills said second trough up to said notch in said second upwardly projecting flange.

* * * * *